United States Patent [19]

Fraioli et al.

[11] Patent Number: 4,645,519
[45] Date of Patent: Feb. 24, 1987

[54] COMPOSITE DESICCANT STRUCTURE

[75] Inventors: Anthony V. Fraioli, Hawthorn Woods; William W. Schertz, Batavia, both of Ill.

[73] Assignee: The United States of America as represented by the United States Department of Energy, Washington, D.C.

[21] Appl. No.: 814,583

[22] Filed: Dec. 30, 1985

Related U.S. Application Data

[63] Continuation of Ser. No. 617,781, Jun. 6, 1984, abandoned.

[51] Int. Cl.$^4$ .............................. B01D 53/04
[52] U.S. Cl. ...................... 55/208; 55/387; 55/389
[58] Field of Search ............... 55/33, 35, 74, 75, 208, 55/387, 389, 524, 267

[56] References Cited

U.S. PATENT DOCUMENTS

| | | | |
|---|---|---|---|
| 2,138,689 | 11/1938 | Altenkirch | 55/33 X |
| 2,138,690 | 11/1938 | Altenkirch | 55/33 X |
| 2,265,389 | 12/1941 | Melaven | 208/119 |
| 2,462,952 | 3/1949 | Dunkak | 55/208 |
| 2,842,223 | 7/1958 | Zall | 55/387 |
| 2,882,243 | 4/1959 | Milton | 55/75 X |
| 2,882,244 | 4/1959 | Milton | 55/75 X |
| 2,979,157 | 4/1961 | Clark | 55/387 |
| 3,015,368 | 1/1962 | Reid | 55/387 X |
| 3,141,729 | 7/1964 | Clarke et al. | 55/33 |
| 3,151,951 | 10/1964 | Reid, Jr. et al. | 55/387 X |
| 3,218,367 | 11/1965 | Chen | 55/75 X |
| 3,387,767 | 6/1968 | Hecht | 55/389 X |
| 3,713,281 | 1/1973 | Asker et al. | 55/387 |
| 3,925,248 | 12/1975 | Moroni et al. | 55/387 X |
| 4,026,680 | 5/1977 | Collins | 55/389 X |
| 4,185,969 | 1/1980 | Bulang | 55/33 X |
| 4,242,112 | 12/1980 | Jebens | 55/208 X |
| 4,341,539 | 7/1982 | Gidaspow et al. | 55/208 X |

FOREIGN PATENT DOCUMENTS

| | | | |
|---|---|---|---|
| 66592 | 6/1974 | Japan | 55/387 |
| 83290 | 7/1975 | Japan | 55/74 |
| 37091 | 3/1976 | Japan | 55/74 |
| 26331 | 2/1982 | Japan | 55/208 |
| 320450 | 10/1929 | United Kingdom | 55/74 |

OTHER PUBLICATIONS

Fraioli, Argonne Report Anl-83-22, "Investigation of Manganese Dioxide as an Improved Solid Desiccant", 7/15/1983.

Primary Examiner—Robert Spitzer
Attorney, Agent, or Firm—William Lohff; James W. Weinberger; Judson R. Hightower

[57] ABSTRACT

A composite formed of small desiccant particles retained in a dark matrix composed of a porous binder containing a transition metal oxide with pores to provide moisture transport with respect to the particles, and metallic fibers to remove the heat of condensation during dehumidification and provide heat for the removal of moisture during regeneration. The moisture absorbing properties of the composite may be regenerated by exposure of the dark matrix to solar radiation with dehumidification occurring at night.

15 Claims, 5 Drawing Figures

COMPOSITE DESICCANT STRUCTURE

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Labatory.

This is a continuation of application Ser. No. 617,781 filed June 6, 1984, now abandoned.

BACKGROUND OF THE INVENTION

This invention relates to systems for removing moisture from a gas and more particularly to systems for dehumidifying air and having the capability of being regenerated thermally.

Silica gel and other similar desiccants have been used for a variety of purposes associated with their adsorbent properties. These include their use in the catalytic processing of organic compositions as illustrated in U.S. Pat. Nos. 2,265,389 and 2,882,243 and moisture absorption as illustrated in U.S. Pat. Nos. 3,141,729 and 4,341,539. In general, with silica gel, it is often in the form of a multiplicity of separate ground particles carried on a suitable support. In this form, the usable surface area of the silica gel for moisture adsorption is limited by requirements associated with its use. The silica gel particles are often sized sufficiently large to reduce losses by attrition and are located in closely packed arrangements to resist movement. In some instances, they are modified to include channels to the interior to increase the usable surface area for adsorption. However, the size and limited exposed surface area limits their effectiveness. Also, regeneration of the silica gel often requires a separate and complex processing operation to remove the adsorbed moisture.

One object of the invention is a desiccant having a large surface area available for moisture adsorption compared to its volume. A second object of the invention is a desiccant which may be regenerated within a relatively short time. An additional object is a dehumidification system utilizing a desiccant capable of being regenerated. Another object is a desiccant capable of being regenerated by the use of a low cost source of heat. These and other objects will become apparent from the following description.

SUMMARY OF THE INVENTION

This invention is directed to a composite formed of a finely divided desiccant in a porous matrix modified by the presence of a transition metal oxide. The matrix may include a porous siliceous composition as a separate binder. Advantageously, the transition metal oxide such as manganese oxide has a pore structure for transmitting moisture to the desiccant during dehumidification and from the desiccant particles during regeneration. Preferably, the composite is particulate or sheet-like and has the matrix exposed on at least a major portion of one or more of major surfaces. The matrix is also preferably dark and absorbs solar energy. The composite advantageously further includes metallic fibers, rods or the like for heat transfer to and from the desiccant particles. In this manner, heat of condensation may be removed and during regeneration, heat may be supplied for moisture removal. Under these conditions, the composite is particularly useful for being regenerated by exposure to solar radiation during which the matrix is heated to an elevated temperature which causes entrained moisture in the desiccant to be removed by evaporation. With transition metal oxides such as manganese dioxide which are dark in color, the temperatures may reach values exceeding 100° C.

Several advantages are associated with the invention. In the composite, small particles of the desiccant may be used which otherwise would be difficult to retain on a support. With small particles of desiccant, improved surface areas of desiccant are available for moisture adsorption. The porous matrix provides channels for moisture transport between the individual particles and between the outer surfaces of the particles. The incorporation of metal fibers provides improved heat transfer to and from the interior of the composite for moisture desorption and readsorption. Structural strength is also improved by the addition of metal or nonmetallic fibers. With a matrix having significant radiant energy absorption, the use of low cost solar energy may be used directly for moisture removal.

DETAIL DESCRIPTION OF THE PREFERRED EMBODIMENT

In accordance with the invention, a composite is provided for dehumidifying purposes which comprises a matrix of porous binder containing a transition metal oxide having internal surfaces defining pores and capable of transmitting moisture along the pore surfaces. Embedded in the matrix are a plurality of desiccant particles which constitute a major portion of the composite. Suitably, the particles are composed of silica gel, zeolite, alumina, activated carbon and the like with silica gel being preferred. The performance of the composite is enhanced by the presence in the matrix of a porous transition metal oxide capable of transferring water along pore surfaces. These oxides are described in copending application Ser. No. 452,361, entitled "Solid Electrolyte Structure" by Anthony V. Fraioli and filed Dec. 22, 1982, which issued as U.S. Pat. No. 4,477,541 which is hereby incorporated herein by reference. In general, the oxide may be expressed as $T_a X_b O_c$ where T is a transition metal, X is a transition metal, Al, Sn and/or an alkali metal such as Li, K, Rb, Cs and the integers a, b and c represent the number of atoms to balance the formula. Preferably, the transition metal oxide readily absorbs solar energy as represented by manganese oxide, nickel oxide, titanium oxide, chromium oxide and the like.

Preferably, the matrix is further characterized by having a plurality of fibers extending into the interior of the matrix. With metal fibers such as copper, aluminum or the like, they advantageously provide heat conducting paths to remove heat of condensation during dehumidification and to impart heat to aid in the removal of moisture during regeneration. These may be small lengths or larger shapes such as nails. With nonmetallic fibers such as graphite, they provide structural strength to the composite.

Figure 1:
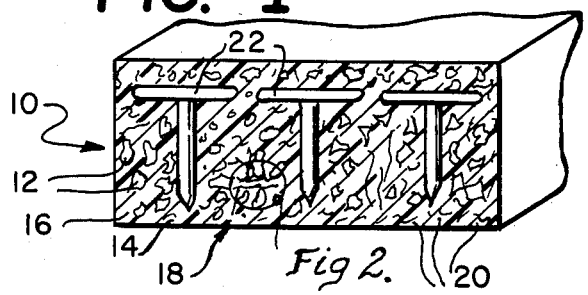
FIG. 1 is a perspective view partially in cross-section of a desiccant block as one embodiment of the invention.
Figure 2:
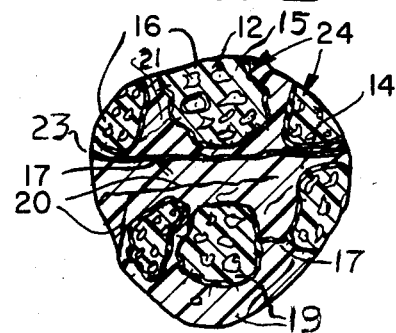
FIG. 2 is an enlarged side view of a section of FIG. 1.

As illustrated in FIG. 1 and 2, the composite 10 of the invention is composed of a plurality of desiccant particles 12 within a matrix 14 composed of a porous binder 16 containing a transition metal oxide capable of transmitting moisture along the pore surfaces 17. Preferably the binder 16 also contains a sodium silicate composition which has been acid neutralized to form a rigid silicate web or skeleton structure 19. As illustrated, the desiccant particles 12 may form part of larger particles 15 prepared in a two-stage procedure as described herein.

Figure 5:
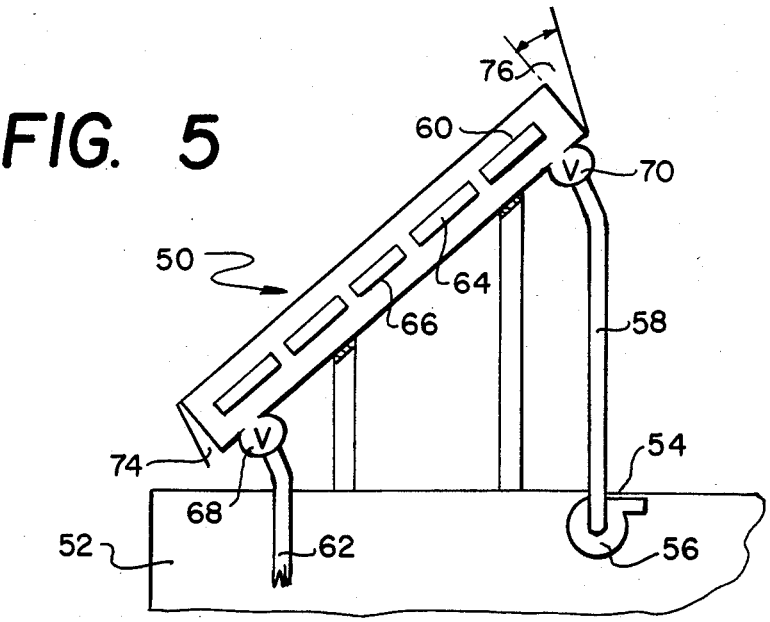
FIG. 5 is a view of a roof mounted dehumidification and solar regenerative system.

The composite 10 may be formed in sheet-like or block structures 18 for use in dehumidification systems illustrated in FIG. 5. Incorporated in the matrix 14 are nonmetallic fibers 20 for structural strength, and metallic fibers or rods illustrated in the form of threads 21 and nails 22 for heat transfer. Advantageously, the fibers 21 extend between particles 12 and between particles 15. Representative dimensions for structure 18 are 12 inches by 4 inches by 1 inch.

Suitably, the desiccant particles may be silica gel, zeolite, alumina, activated carbon and the like. Preferably, the desiccant is silica gel. In this invention, the desiccant is in the form of small particles held together in a porous binder composition. With small particles, increased surface area of the desiccant is possible in a larger structure. Suitably, the desiccant particles will have an exterior dimension in the order of about 1–300 $\mu$m and preferably about 1–150 $\mu$m.

While binder compositions may be prepared in which the porous transition metal oxide is present in relatively large amounts (e.g., above 70 wt. %), weight percentages in the order of about 20–80 wt. % of the binder composition are used. Frequently, a supplemental binder is required to provide the desired binding properties. A sodium silicate may be used for this purpose and when acid neutralized provides a rigid silicate web or skeleton of the desiccant particles held together. An alumina gel may also be used to form the binder.

In forming the larger structure, the desiccant particles may be mixed with the binder composition and one or more fibers for strength and heat transfer. The resultant paste is packed into a form preferably having larger metal nails or rods in addition to smaller fibers (e.g., 5 $\mu$m in diameter) and then baked and/or chemically treated to form the desired web-like structure.

In general, the composite contains desiccant in major amounts of over 50 wt. %, advantageously about 50–95 wt. % and preferably about 80–95 wt. %. The inert components are preferably below about 20 wt. % and especially about 1–10 wt. %. Usually, the fiber content is about 5–20 wt. % of the binder composition.

In a preferred method of producing the composite, a two stage process is used. In the first stage, particles of the type illustrated in FIG. 3 may be used. These are generally in the order of 1–150 $\mu$m in diameter and are mixed with a binder composition containing a transition metal oxide and a siliceous binder with metallic and nonmetallic fibers also being present. After being connected to the web-like structure, the composite is reduced in size to small particles (e.g., 50–300 $\mu$m) which are then formed into paste mixture with additional binder composition and fibers. Heat degradable fibers such as cellulose fibers are also included to form larger pores 23 in FIG. 2 (1–100 $\mu$m) when removed. Conversion of the binder composition to a web-like structure is then accomplished. In the second stage, larger fibers of 1–2 inches may also be used in an arrangement containing metallic nails or rods. As illustrated in FIG. 2, coated particles 24 are dispersed in the matrix.

Figure 3:
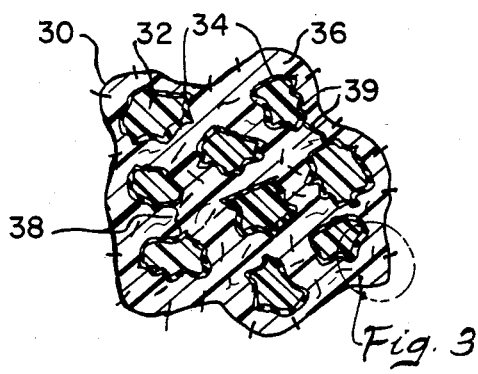
FIG. 3 is a side view of a composite particle of the invention.
Figure 4:
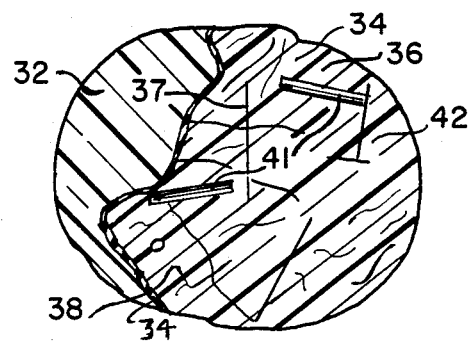
FIG. 4 is an enlarged view of a section of FIG. 3.

FIGS. 3 and 4 provide illustrations of a composite particle 30 which is subsequently combined with further binder compositions and fibers to form the structure of FIG. 1. As illustrated, particle 30 includes desiccant particles 32 with coating 34 of a porous binder 36. Graphite, boron nitride or other similar nonmetallic fibers 37 are added to provide structural strength. These fibers may also be metal-plated for heat transfer as fibers 38. Pores 39 (e.g., 0.01–1 $\mu$m) are provided in the binder 36 for moisture transfer.

FIG. 4 provides an enlargement of FIG. 3 to illustrate the presence of the transition metal oxide 41 and supplemental binder 42.

FIG. 5 provides a schematic of a dehumidification and regeneration system using the composite structures 18 of FIG. 1 in an assembly 50 mounted on the roof 54 of building 52. As illustrated, fan 56 and ductwork 58, 60 and 62 act to recirculate air in building 52 past an arrangement 64 of composite blocks 66. Valves 68 and 70 isolate the system from outside air. Advantageously, the dehumidification is carried out during nighttime hours with regeneration occurring during daylight hours.

As illustrated in FIG. 5, regeneration may be carried out by opening upper and lower vents 74 and 76 on collector frame 50 and passing outside air over the composite blocks 66. In the process, the solar radiation is the driving force to raise the temperature of the blocks 66 to increase the rate of moisture removal.

The above invention provides a useful desiccant composite, a method of producing the composite, and a method of using the composite for dehumidifying moist air and for regenerating the moist composite using a source of solar energy. The metal fibers incorporated into the composite provide heat transfer paths to and from the interior of the composite to remove heat of condensation during dehumidification and for adding heat during regeneration.

The foregoing description of embodiments of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. A composite useful for dehumidifying purposes and comprising a matrix of a porous binder as a solid web containing a transition metal oxide having internal surfaces defining pores and a plurality of desiccant particles embedded in the matrix, the desiccant particles having diameters in the range of about 1–300 $\mu$m, constituting a major portion of the composite and being selected from the group consisting of silica gel, zeolite, alumina, activated carbon and mixtures thereof, the composite being in sheet-like form with exterior surfaces, a portion of the particles being below the exterior surfaces and covered by other particles, the transition metal oxide in the web being capable of transmitting moisture along the pore surfaces between desiccant particles and between the exterior surfaces and the desiccant particles.

2. The composite of claim 1 having a major surface and the matrix exposed over at least a major portion of said surface, the matrix being a light absorber and being heated when exposed to solar radiation to cause entrained moisture to be removed by desorption and evaporation.

3. The composite of claim 1 containing a minor amount of metallic fibers distributed in the matrix for heat transfer to and from the desiccant particles.

4. The composite of claim 3 wherein the desiccant is silica gel.

5. The composite of claim 3 wherein the desiccant is zeolite.

6. The composite of claim 1 wherein the transition metal oxide is manganese dioxide and the binder composition includes a rigid silicate web.

7. The composite of claim 6 containing a minor amount of metallic fibers distributed in the matrix for heat transfer to and from the desiccant particles.

8. The composite of claim 7 wherein the desiccant is silica gel with the particles having diameters in the range of about 1–150 $\mu$m.

9. The composite of claim 8 containing a minor amount of nonmetallic fibers distributed in the matrix for structural reinforcement.

10. A method of producing a composite in sheet-like form useful for dehumidifying air comprising the steps of:
  providing a liquid binder containing a transition metal oxide,
  forming a mixture of the liquid binder composition and a plurality of desiccant particles embedded in the binder composition and having diameters in the range of about 1–300 $\mu$m, and
  treating the binder composition to form a binder in the form of rigid solid web containing the transition metal oxide and interconnecting the particles, the web and particles being in sheet-like form having exterior surfaces with a portion of the particles being below the exterior surfaces and covered by other particles.

11. The method of claim 10 wherein the forming step includes incorporating metallic fibers within the binder composition to provide heat transfer paths to and from the desiccant particles.

12. The method of claim 11, wherein the forming and treating steps form a first structure and the method further includes the steps of dividing the first structure into a plurality of second particles,
  forming a second mixture of said second particles and a second liquid binder composition, and
  treating the second binder composition to form a second binder in the form of a rigid solid web interconnecting the second particles.

13. The method of claim 12 wherein the forming of said second mixture includes incorporating metallic fibers within the second binder composition to provide heat transfer paths to and from the second particles.

14. The method of claim 13 wherein the forming of said second mixture includes incorporating heat degradable fibers in said second binder composition, and said method includes the step subsequent to the second treating step of heating the second mixture to remove at least a portion of the degradable fibers to form additional pores in the composite.

15. The method of claim 14 wherein the forming of said second mixture includes the step of incorporating metallic rods in the mixture.

* * * * *